United States Patent
Kowalski et al.

(10) Patent No.: US 10,036,256 B2
(45) Date of Patent: Jul. 31, 2018

(54) GAS TURBINE WITH TWO SWIRL SUPPLY LINES FOR COOLING THE ROTOR

(71) Applicant: Siemens Aktiengesellschaft, Munich (DE)

(72) Inventors: Christian Kowalski, Oberhausen (DE); Joachim Krützfeldt, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/514,763

(22) PCT Filed: Oct. 1, 2015

(86) PCT No.: PCT/EP2015/072709
§ 371 (c)(1),
(2) Date: Mar. 27, 2017

(87) PCT Pub. No.: WO2016/055354
PCT Pub. Date: Apr. 14, 2016

(65) Prior Publication Data
US 2017/0218771 A1   Aug. 3, 2017

(30) Foreign Application Priority Data
Oct. 7, 2014 (EP) .................... 14187954

(51) Int. Cl.
*F01D 5/08* (2006.01)
*F02C 9/18* (2006.01)
*F01D 25/12* (2006.01)

(52) U.S. Cl.
CPC ............. *F01D 5/081* (2013.01); *F01D 5/084* (2013.01); *F01D 5/087* (2013.01); *F01D 25/12* (2013.01);
(Continued)

(58) Field of Classification Search
CPC . F01D 5/06; F01D 5/081; F01D 5/082; F01D 5/084; F01D 5/085; F01D 5/087;
(Continued)

(56) References Cited

U.S. PATENT DOCUMENTS 4,291,531 A    9/1981 Campbell
5,575,617 A *  11/1996 Marmilic ............... F01D 5/081
                                                        415/115
(Continued)

FOREIGN PATENT DOCUMENTS

EP    1367225 A2   12/2003
EP    1736635 A2   12/2006
(Continued)

OTHER PUBLICATIONS

EP Search Report dated Apr. 9, 2015, for EP patent application No. 14187954.4.
(Continued)

*Primary Examiner* — Ninh H Nguyen
*Assistant Examiner* — Topaz L Elliott
(74) *Attorney, Agent, or Firm* — Beusse Wolter Sanks & Maire

(57) ABSTRACT

A gas turbine has at least one rotor and inner housing part to form an annular chamber therebetween. The annular chamber is fluidically connected to a compressor portion at one end and expansion turbine portion at the other, and is supplied with cooling fluid. First and second swirl supply lines supply the annular chamber with cooling fluid. The cooling fluid is supplied to the surface of the rotor with a tangential flow component, and a first seal element in the annular chamber acts as a flow resistor. A discharge line in the rotor between the first seal element and expansion turbine portion receives and discharges cooling fluid from the second swirl supply line. No bypass lines are provided
(Continued)

from the first swirl supply line such that the cooling fluid is conducted around the second swirl supply line in order to be returned to a location of the annular chamber.

19 Claims, 1 Drawing Sheet

(52) U.S. Cl.
CPC ............ *F02C 9/18* (2013.01); *F05D 2260/20* (2013.01); *F05D 2260/205* (2013.01)

(58) Field of Classification Search
CPC ...... F01D 11/02; F01D 25/12; F05D 2240/63; F02C 9/18
See application file for complete search history.

(56) References Cited

U.S. PATENT DOCUMENTS

| | | | |
|---|---|---|---|
| 6,471,216 B1* | 10/2002 | Brainch | F01D 11/02 277/418 |
| 6,672,072 B1 | 1/2004 | Giffin, III | |
| 8,677,766 B2* | 3/2014 | Laurello | F01D 5/081 415/115 |
| 2003/0223856 A1* | 12/2003 | Yuri | F01D 5/08 415/1 |
| 2004/0046326 A1 | 3/2004 | Yuri et al. | |
| 2007/0089430 A1 | 4/2007 | Klinger | |
| 2017/0037730 A1* | 2/2017 | Tsuji | F01D 25/12 |

FOREIGN PATENT DOCUMENTS

| | | |
|---|---|---|
| EP | 1537296 B1 | 6/2013 |
| JP | S55131531 A | 10/1980 |
| JP | 2000097048 A | 4/2000 |
| JP | 2010196596 A | 9/2010 |

OTHER PUBLICATIONS

International Search Report dated Dec. 10, 2015, for PCT/EP2015/072709.

JP Office Action dated Aug. 21, 2017, for JP patent application No. 2017-518510.

* cited by examiner

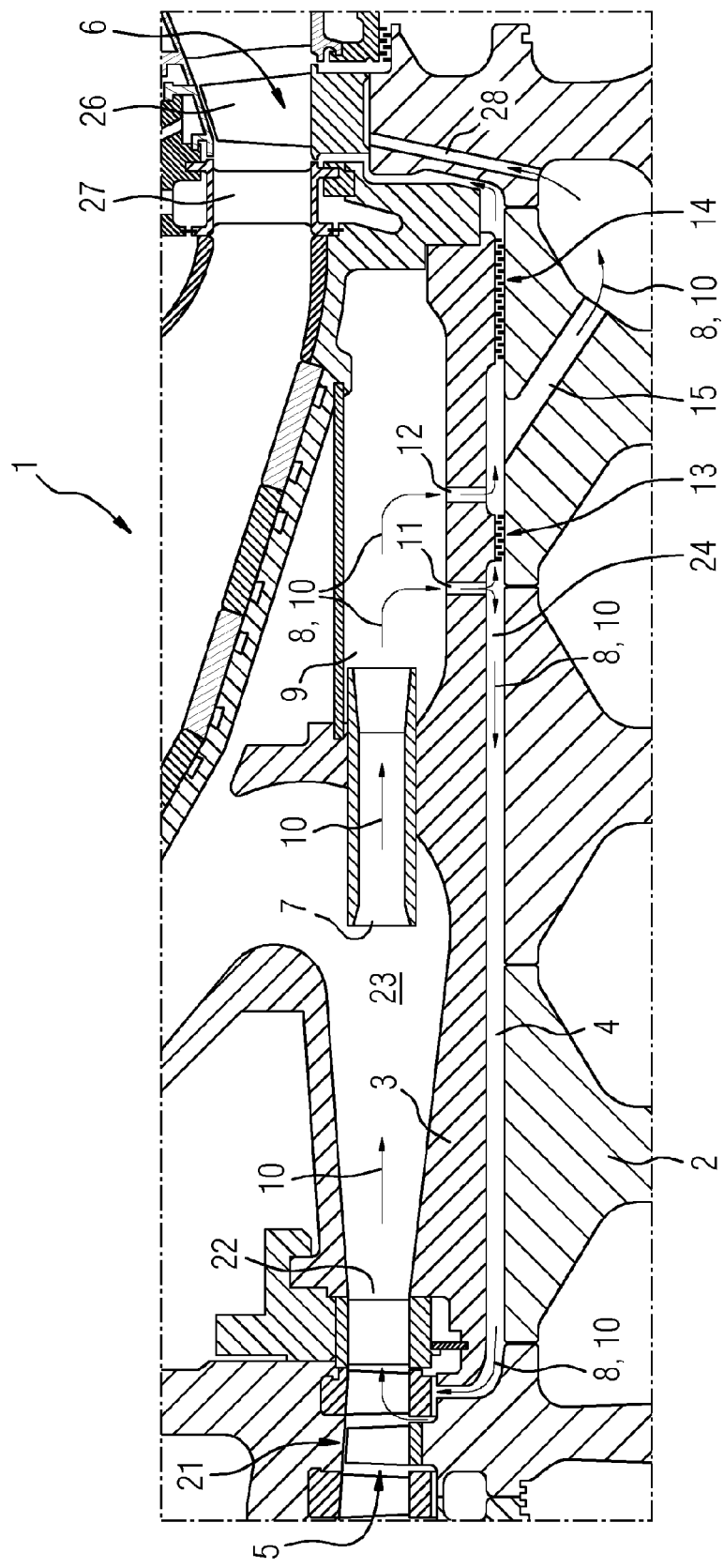

GAS TURBINE WITH TWO SWIRL SUPPLY LINES FOR COOLING THE ROTOR

CROSS REFERENCE TO RELATED APPLICATIONS

This application is the U.S. National Stage of International Application No. PCT/EP2015/072709 filed Oct. 1, 2015, and claims the benefit thereof. The International Application claims the benefit of Oct. 7, 2014 Application No. EP14187954 filed Oct. 7, 2014. All of the applications are incorporated by reference herein in their entirety.

FIELD OF INVENTION

The present invention relates to a gas turbine having at least one rotor and also an inner casing part for forming an annulus between rotor and inner casing part, wherein the annulus is designed for being supplied with a cooling fluid which allows the rotor to be cooled during operation of the gas turbine.

BACKGROUND OF INVENTION

On account of the high gas temperatures during the combustion operation in a gas turbine, it is necessary for numerous functional components to be suitably cooled. Particularly in the region of the center section of a gas turbine in which the hot gas from the combustion chamber which originates from the combustion thermally interacts with numerous components, efficient cooling of the rotating rotor is necessary. Such cooling is typically carried out via an annulus which extends in the longitudinal direction of the rotor and into which is introduced a cooling fluid, usually compressor air, in order to also dissipate thermal energy from the annulus toward the outside by its discharge line.

In essence, two functions are assigned to the cooling fluid which is introduced into the annulus. In addition to the function of cooling of the rotor, the cooling fluid also serves for the cooling of rotor blades of the expansion turbine, wherein for this the cooling fluid is conducted out via suitable discharge lines in the rotor toward the rotor blades of the expansion turbine. For the transfer of the cooling fluid into the relevant discharge lines of the rotor it is necessary, however, that the transfer effort or entry effort at the discharge line opening is as little as possible. For this reason, the cooling fluid is in most cases introduced into the annulus via a pre-swirl system which correspondingly accelerates the cooling fluid tangentially in the direction of movement of the rotor to its surface. Ideally, the cooling fluid is brought up to circumferential speed of the rotor so that additional entry effort during transfer into the discharge line openings can be saved. For the transfer, the cooling fluid typically discharges from suitably formed swirl supply lines of the pre-swirl system, passes across the annulus in its transverse direction (perpendicularly to the longitudinal direction of the rotor) and is fed to an opening of the discharge line in the rotor.

On account of the tangential flow conditioning of the cooling fluid in relation to the surface of the rotor, the transfer of mechanical rotor power to the cooling fluid, generating heat, is also largely reduced or even prevented. When discharging from the swirl supply line, the cooling fluid therefore finds itself in a thermally conditioned state which is particularly suitable for heat dissipation on the surface of the rotor to be cooled so that the transfer of heat to the cooling fluid can be carried out efficiently on account of the local temperature drop without heating of the cooling fluid on account of the rotor-fluid friction having a significantly negative influence. In order to be able to suitably dissipate the heat losses of the rotor to the outside after corresponding heat transfer, it is necessary to be able to discharge the cooling fluid from the annulus in a controlled manner.

Such an annulus system for cooling the rotor and also for forwarding the cooling fluid into the inlet passages of the rotor is described for example in EP 1 537 296 B1. Described therein is an annulus in which cooling fluid flows into the annulus from two swirl supply lines in each case or transfers into a corresponding inlet opening of a cooling fluid discharge line in the rotor. Both swirl supply lines are designed for supplying the annulus with cooling fluid, wherein the cooling fluid is acted upon by a flow component in the tangential direction to the surface of the rotor, and wherein the first swirl supply line and the second swirl supply line are also fluidically decoupled from each other by means of a plurality of sealing elements. So as not to hinder the intended transfer of cooling fluid from the second swirl supply line into the inlet opening of the discharge line of the rotor, the invention from the prior art, however, provides to install a bypass line which enables the cooling fluid in the annulus to bypass the second swirl supply line. As a consequence of the bypass line, a comparatively lower disturbing transverse flow occurs in the region of the crossover section between the second swirl supply line and the inlet opening of the discharge line in the rotor so that an efficient transfer of cooling fluid into the rotor can be carried out.

A disadvantage of this embodiment which is known from the prior art, however, is first of all a considerably higher technical cost since the bypass line has to be built into internal casing parts of the gas turbine. Furthermore, in the case of the solution which is known from the prior art, there is also the occurrence of dead spaces which are formed between the first and second swirl supply lines and in which the rotor cooling is in the first instance carried out by convective transportation of the cooling fluid. This, however, ensures an only unsatisfactory cooling in the sections of the rotor which delimit the dead spaces, and therefore leads to high heating of the rotor in certain areas which, however, it is necessary to avoid.

SUMMARY OF INVENTION

In association with these disadvantages from the prior art, the technical requirement therefore arises to propose a gas turbine which can avoid the disadvantages which are known from the prior art. In particular, the gas turbine which is to be proposed is to enable an advantageous cooling of the components which delimit the annulus but without requiring high technical outlay. Above all, dead spaces in the annulus, which give cause to different cooling rates in certain areas, are to be avoided.

These objects upon which the invention is based are achieved by means of a gas turbine according to the independent claim.

The objects upon which the invention is based are especially achieved by means of a gas turbine having at least one rotor and also an inner casing part for forming an annulus between rotor and inner casing part, wherein at one end the annulus is fluidically connected to a compressor section and at the other end is fluidically connected to an expansion turbine section, wherein the annulus is designed for being supplied with a cooling fluid which allows the rotor to be cooled during operation of the gas turbine, and wherein provision is also made for a first swirl supply line and a second swirl supply line which are designed for supplying the annulus with cooling fluid, wherein the cooling fluid is acted upon by a flow component in the tangential direction to the surface of the rotor, and wherein between the first swirl supply line and the second swirl supply line provision is also made in the annulus for a first sealing element as a flow resistance, wherein between the first sealing element and the expansion turbine section provision is also made for a discharge line in the rotor which is designed for receiving and discharging cooling fluid from the second swirl supply line and wherein no provision is made for a bypass line which could conduct cooling fluid from the first swirl supply line in such a way that the thereby conducted cooling fluid is conducted around the second swirl supply line in order to be fed again to a location of the annulus.

According to the invention, the term of rotor refers to all the rotating parts of the gas turbine rotor assembly which bring about a boundary of the annulus. In this case, disks and spacers of the gas turbine rotor assembly are especially included as well.

According to the invention, it is therefore provided to subdivide the annulus by means of a sealing element into two regions which are fluidically decoupled from each other, wherein the first region is supplied in the first instance with cooling fluid by means of a first swirl supply line and the second region is supplied in the first instance with cooling fluid by means of a second swirl supply line. In this case, however, no provision is expressly to be made for a bypass line for conducting cooling fluid around the second swirl supply line so that the technical cost is correspondingly reduced and the cooling function of the cooling fluid on the entire surfaces which form the annulus can be ensured.

In order to achieve efficient cooling of the rotating surfaces of the rotor, the cooling fluid is transferred into the annulus via the two swirl supply lines into the respective regions which are fluidically separated from each other. By means of the sealing element, the annulus is subdivided into two regions which can fulfill the two above-described functions largely separately from each other. In that region which is not provided for a transfer of cooling fluid into the inlet openings of the discharge line of the rotor for forwarding of the cooling fluid onto the rotor blades of the expansion turbine, an efficient provision of the annulus with a practically exclusive cooling function for the rotor surface can be carried out. In the other region of the annulus, however, consideration is to be given to a transverse flow, i.e. flow in the longitudinal direction of the annulus, which fluidically interacts with the cooling fluid flow which is to be transferred into the inlet opening of the discharge line of the rotor. The interaction leads to a slightly lower transfer efficiency of the cooling fluid into the inlet opening of the discharge line, but this can be accepted in the interests of an improved thermal cooling of the surface of the rotor. Moreover, the transverse flow quantity, which interacts with the cooling fluid which is transferred into the inlet opening of the discharge line, is advantageously comparatively smaller than the quantity of cooling fluid which is transferred into the inlet opening of the discharge line so that only a small efficiency loss occurs during the transfer.

The use of two separated swirl supply lines, moreover, allows the separate adjustment of mass flows and pressures of the cooling fluid in the respective regions of the annulus. By suitable selection of the first sealing element, these can also be suitably adjusted in an essentially improved manner for the respective function of the cooling fluid.

At this point, reference is to be made to the fact that the presently described gas turbine is in the first instance advantageously exclusively a stationary gas turbine. The inner casing part is typically constructed as a shaft cover so that the annulus is formed between the rotating parts of the rotor and the shaft cover.

Since according to the invention no provision is made for a bypass line for bypassing the second swirl supply line, no dead spaces, in which cooling of the surface of the rotating parts would only be effected by convective cooling, are formed either. Rather, the entire annulus is efficiently cooled in both regions defined by the first sealing element by means of a rotating cooling fluid flow in the tangential direction to the rotor surface.

At the same time, a satisfactory separation of the respective regions which are separated by means of the first sealing element can be undertaken so that a comparatively efficient decoupling of the two functions, specifically cooling of the rotor surface and transferring of the cooling fluid into the inlet opening of the discharge line of the rotor, can be achieved. Moreover, as a result of flow in the longitudinal direction of the annulus across the second sealing element an adequate surface cooling of the moving parts of the rotor in the relevant region can be achieved.

According to a first especially advantageous embodiment, it is provided that provision is also made in the annulus for a second sealing element which is arranged between the second swirl supply line and the expansion turbine section. The second sealing element is especially provided between the discharge line in the rotor and the expansion turbine section. The second sealing element in this case basically prevents an exchange of cooling fluid with adjacent regions of the expansion turbine section so that cooling fluid loss there can be largely minimized.

Moreover, it is possible according to the embodiment to largely minimize the region between first sealing element and second sealing element so that this region in the first instance serves for transferring cooling fluid into the inlet opening of the discharge line in the rotor. This region of the annulus which is defined by the first and second sealing elements can especially be of a smaller design, especially only a fifth or even less in the direction of the longitudinal extent of the annulus, than the other region which is defined by the first sealing element and the compressor section. On account of the advantageous tangential speed of the cooling fluid relative to the surface of the rotor between the first and second sealing elements, comparatively little kinetic energy has to be added to the cooling fluid, as a result of which the energy transfer losses can be reduced. On account of the reduced energy transfer losses, the temperature of the cooling fluid is comparatively lower so that the cooling capacity in the region is also relatively greater. In addition to an improved level of gas turbine efficiency the result is also a more efficient level of cooling.

According to a continuation of this idea, the discharge line is arranged radially in the rotor. The inlet opening of the discharge line is especially arranged radially in the rotor. As a result, the embodiment differs in particular from an axial embodiment which typically requires a greater space requirement. An axial embodiment, that is to say for transferring the cooling fluid from the second swirl supply line into the inlet opening of the discharge line in the rotor in the axial direction, is for example known from the document cited above in relation to the prior art. On account of the radial arrangement of the discharge line, dead spaces, in which convective cooling has a significant proportion of the overall cooling, can also be efficiently prevented.

According to a further embodiment of the invention, it is provided that the effective flow cross section of the second swirl supply line is larger than that of the first swirl supply line. The effective flow cross section is in this case the mean or average flow cross section and therefore defines the flow rate of cooling fluid per unit of time. In this respect, it can be ensured that the cooling fluid flow from the second swirl supply line for transfer into the inlet opening of the discharge line in the rotor is influenced in the longitudinal direction only to a small degree by the transverse flow along the surface of the rotor. Furthermore, the pressure ratios can be established in such a way that the region at the first sealing element pointing toward the expansion turbine section has a higher static pressure than that at the first sealing element on the side pointing toward the compressor section. As a consequence of this, only a comparatively small proportion of the cooling fluid which flows through the first swirl supply line into the annulus flows through the first sealing element so that in the annulus, between the compressor section and the first sealing element, a backflow can basically be effected toward the compressor section. The backflow is therefore conducted against the main flow of the hot gas in the gas turbine in a direction which is oriented toward the compressor.

According to a further embodiment of the invention, it is provided that the ratio of effective flow cross section of first swirl supply line and second swirl supply line is selected in such a way that during operation of the gas turbine less than 10% of the cooling fluid which is conducted through the first swirl supply line also flows through the first sealing element. In this respect, comparatively little cooling fluid, which flows from the first swirl supply line into the annulus, mixes with the cooling fluid which is fed from the second swirl supply line into the annulus. In this respect, the tangential flow component of the cooling fluid from the second swirl supply line is also influenced to only a comparatively small degree.

On account of the higher pressure in the region of the first swirl supply line in comparison to the compressor section, it can furthermore be ensured that between first swirl supply line and compressor section a backflow along the longitudinal direction of the annulus can form so that efficient cooling of the components which delimit the annulus can be achieved. Specifically, the static pressure at the outlet of the first swirl supply line toward the annulus is greater than the static pressure in the annulus at the compressor section. The fed-back cooling fluid can in this case re-enter the compressor in the region of the compressor section and, after possible compression, is discharged from the compressor again.

According to a further embodiment of the invention, it is provided that the end of the annulus which is associated with the compressor section is designed in such a way that during operation of the gas turbine cooling fluid can be transferred into the region of the last rotor blade row of the compressor. As a consequence of this, the cooling fluid which is introduced into the annulus by means of the first swirl supply line is transferred again into the compressor so that in essence a cycle can be formed. The cooling fluid discharges from the compressor, specifically in compressed form again, and can be fed again to the first swirl supply line. By the forming of such a cyclic flow, the loss of cooling fluid can be efficiently prevented, as a result of which the gas turbine efficiency can also be kept comparatively high during operation.

According to a further embodiment of the invention, it is provided that both the first swirl supply line and the second swirl supply line are provided in the inner casing part.

According to a further embodiment of the invention, it is provided that both the first swirl supply line and the second swirl supply line are in fluid communication with the same plenum for supplying with cooling fluid at the same pressure. Both swirl supply lines are therefore fed from the same cooling fluid reservoir so that the pressure setting in the respective region of the annulus can easily be undertaken by a suitable geometry of the respective swirl supply lines and of the sealing elements.

The invention is to be described in detail below with reference to a FIGURE. In this case, reference is to be made to the fact that the FIGURE is to be only schematically understood and this represents no limitation with regard to the practicability of the invention.

All the technical features shown in the FIGURE, which are provided with the same designations, shall have an identical technical effect.

Reference is furthermore to be made to the fact that optional combinations of the subsequently described technical features are to be claimed in the present case, providing these combinations are able to achieve the objects upon which the invention is based.

BRIEF DESCRIPTION OF THE DRAWINGS

In this case, in the drawing:
FIG. 1 shows a cross-sectional view through an annulus of a gas turbine according to the invention in the longitudinal direction of the gas turbine.

DETAILED DESCRIPTION OF INVENTION

The present FIGURE shows a cross-sectional view in the longitudinal direction along the annulus 4 of a gas turbine 1 according to the invention. The annulus 4 is in this case delimited at the ends by a compressor section 5 and also by an expansion turbine section 6 respectively and is arranged between an inner casing part 3, which is typically formed as a shaft cover, and the rotor 2. The components of the rotor 2, which include compressor rotor blades 21, execute a rotational movement during operation of the gas turbine 1 so that these move in relation to the static inner casing part 3 (out of the plane of the paper or into this).

On account of the high temperatures which prevail in this region, cooling of the inner casing part 3 and also of the rotor 2 is necessary in order to be able to correspondingly dissipate the heat in these regions. The cooling is undertaken by means of a cooling fluid 8 which in the present case is compressor air 10, wherein the compressor air 10 discharges in the region of the compressor exit 22 and is decelerated in the region of the diffuser 23. On account of the deceleration, a comparatively higher static pressure is established, by means of which the compressor air 10, after passing through a further opening 7 in the casing, can be transferred to a suitable plenum 9. The plenum 9 serves as a reservoir for the compressor air 10 in order to supply the two swirl supply lines 11 and 12, which are in fluid communication with the annulus 4, with cooling fluid 8 (compressor air 10).

The two swirl supply lines 11 and 12 allow the transfer of cooling fluid 8 into regions of the annulus 4 in each case which are separated by means of a first sealing element 13 and in which two functions are basically performed by the cooling fluid 8. On the one hand, the cooling fluid 8 serves for the top-surface dissipation of heat from the components which delimit the annulus 4, and on the other hand the cooling fluid 8 serves for the transfer into an discharge line 15, which has an inlet opening which is not provided with a designation, to a passage system 28 in the rotor 2. The passage system 28 consequently allows the cooling fluid 8 to be fed to the first rotor blade row 26 of the expansion turbine for cooling purposes. In the embodiment shown, the first rotor blade row 26 is disposed adjacent to (e.g. downstream of) a turbine guide vane 27.

For a transfer which is as efficient as possible of the cooling fluid 8 from the second swirl supply line 12 into the inlet opening of the discharge line 15, the cooling fluid 8 is acted upon by means of the second swirl supply line 12 with a tangential movement component which allows the cooling fluid 8, after discharge from the second swirl supply line 12, to flow basically in the circumferential direction of the rotor surface. As a result of this, the effect of the cooling fluid 8 having to be acted upon by a corresponding movement component during transfer into the inlet opening of the discharge line 15 of the rotor itself, as a result of which the rotor 2 would be correspondingly deprived of rotational energy, is largely avoided. The region of the annulus 4 which is associated with the second swirl supply line 12 is sealed at the ends in each case by means of a sealing element 13 and 14. In this respect, it can also be ensured that a higher proportion of cooling fluid 8 which is fed via the second swirl supply line 12 can be transferred into the discharge line 15. A smaller proportion, however, flows in the longitudinal direction of the annulus 4 across the second sealing element 14 into the expansion turbine section 6. From there, the cooling fluid 8, together with the hot gas from the gas turbine 1 which is expanded in the expansion turbine, is discharged.

Furthermore, cooling fluid 8 is fed to the annulus via a first swirl supply line 11. The cooling fluid 8 flows in this case into a region between the first sealing element 13 and the compressor section 5, wherein a backflow is formed so that a cooling fluid flow flows in the annulus 4 from the first swirl supply line 11 toward the compressor. This cooling fluid flow serves exclusively for transporting heat from the components which delimit this region of the annulus 4. After transfer of the cooling fluid 8 into the compressor section 5, the cooling fluid 8, after renewed compression, is fed again via the compressor exit 22 to the diffuser 23 as compressor air 10. In this respect, a circular flow can be established between the compressor section 5 and the first swirl supply line 11, and the heat from the respectively associated region of the annulus 4 can be efficiently dissipated.

Depending on the setting of the flow cross sections of the first swirl supply line 11 or of the second swirl supply line 12, and depending on the sealing effect of the first sealing element 13 or of the second sealing element 14, the flow ratios in the two regions of the annulus 4 which are separated by means of the first sealing element 13 can be advantageously established so that for example a backflow of the cooling fluid 10 toward the compressor section 5 can also be established.

Further embodiments are gathered from the dependent claims.

The invention claimed is:
1. A gas turbine comprising:
   a rotor and an inner casing part for forming an annulus between the rotor and the inner casing part, wherein at one end the annulus is fluidically connected to a compressor section and at an other end is fluidically connected to an expansion turbine section, wherein the annulus is designed for being supplied with a cooling fluid which allows the rotor to be cooled during operation of the gas turbine, and
   a first swirl supply line and a second swirl supply line which are designed for the annulus to be supplied with cooling fluid drawn from a flow of cooling fluid that is flowing along a flow path from the compressor section to the expansion turbine section at a location in the flow path downstream of the compressor section, wherein the cooling fluid is acted upon by a flow component in a tangential direction to a surface of the rotor, and
   a first sealing element, wherein between the first swirl supply line and the second swirl supply line provision is made in the annulus for the first sealing element as a flow resistance,
   a discharge line, wherein between the first sealing element and the expansion turbine section provision is made for the discharge line in the rotor which is designed for cooling fluid to be received and discharged from the second swirl supply line,
   wherein no provision is made for a bypass line which could conduct cooling fluid from the first swirl supply line in such a way that the thereby conducted cooling fluid is conducted around the second swirl supply line in order to be fed again to a location of the annulus,
   wherein in the annulus between the first swirl supply line and the compressor section a backflow of the cooling fluid along a longitudinal direction of the annulus is formed,
   wherein a first flow circuit is formed in which the cooling fluid flows from an outlet of the compressor section, to the first swirl supply line, through the annulus, and back into the compressor section at a location upstream of the outlet of the compressor section,
   wherein a second flow circuit is formed in which the cooling fluid flows from the compressor section, to the second swirl supply line, through the annulus, and through the discharge line, and
   wherein an effective flow cross section of the second swirl supply line is larger than that of the first swirl supply line.
2. The gas turbine as claimed in claim 1, further comprising:
   a second sealing element in the annulus which is arranged between the second swirl supply line and the expansion turbine section,
   wherein in a third flow circuit the cooling fluid flows through the second swirl supply line, through the annulus, through the second sealing element, and into the expansion turbine section.
3. The gas turbine as claimed in claim 2,
   wherein the discharge line is arranged radially in the rotor.
4. The gas turbine as claimed in claim 1,
   wherein a ratio of effective flow cross sections of the first swirl supply line and the second swirl supply line is selected in such a way that during operation of the gas turbine less than 10% but more than 0% of the cooling fluid which is conducted through the first swirl supply line flows through the first sealing element.
5. The gas turbine as claimed in claim 1,
   wherein during operation of the gas turbine, a static pressure at the outlet of the first swirl supply line toward the annulus is greater than a static pressure in the annulus at the compressor section.
6. The gas turbine as claimed in claim 1,
   wherein the one end of the annulus which is associated with the compressor section is designed in such a way that during operation of the gas turbine the cooling fluid can be transferred into a region of a last rotor blade row of the compressor section.

7. The gas turbine as claimed in claim 1,
wherein both the first swirl supply line and the second swirl supply line are provided in the inner casing part.

8. The gas turbine as claimed in claim 1,
wherein both the first swirl supply line and the second swirl supply line are in fluid communication with the same plenum for supplying with cooling fluid at the same pressure.

9. The gas turbine as claimed in claim 1, wherein in a fourth flow circuit the cooling fluid flows from the first swirl supply line and through the first sealing element.

10. The gas turbine as claimed in claim 1, further comprising a diffuser, wherein in the first flow circuit the cooling fluid flows from the outlet of the compressor section, to the diffuser, and then to the first swirl supply line, and wherein in the second flow circuit the cooling fluid flows from the compressor section, to the diffuser, and then to the second swirl supply line.

11. A gas turbine comprising:
a rotor and an inner casing part for forming an annulus between the rotor and the inner casing part, wherein at one end the annulus is fluidically connected to a compressor section and at an other end is fluidically connected to an expansion turbine section, wherein the annulus is designed for being supplied with a cooling fluid which allows the rotor to be cooled during operation of the gas turbine, and
a first swirl supply line and a second swirl supply line which are designed for the annulus to be supplied with cooling fluid drawn from a flow of cooling fluid that is flowing along a flow path from the compressor section to the expansion turbine section at a location in the flow path downstream of the compressor section, wherein the cooling fluid is acted upon by a flow component in a tangential direction to a surface of the rotor, and
a first sealing element, wherein between the first swirl supply line and the second swirl supply line provision is made in the annulus for the first sealing element as a flow resistance,
a discharge line, wherein between the first sealing element and the expansion turbine section provision is made for the discharge line in the rotor which is designed for cooling fluid to be received and discharged from the second swirl supply line,
wherein no provision is made for a bypass line which could conduct cooling fluid from the first swirl supply line in such a way that the thereby conducted cooling fluid is conducted around the second swirl supply line in order to be fed again to a location of the annulus,
wherein in the annulus between the first swirl supply line and the compressor section a backflow of the cooling fluid along a longitudinal direction of the annulus is formed,
wherein a first flow circuit is formed in which the cooling fluid flows from an outlet of the compressor section, to the first swirl supply line, through the annulus, and back into the compressor section at a location upstream of the outlet of the compressor section,
wherein a second flow circuit is formed in which the cooling fluid flows from the compressor section, to the second swirl supply line, through the annulus, and through the discharge line, and
wherein a ratio of effective flow cross sections of the first swirl supply line and the second swirl supply line is selected in such a way that during operation of the gas turbine less than 10% but more than 0% of the cooling fluid which is conducted through the first swirl supply line flows through the first sealing element.

12. The gas turbine as claimed in claim 11, further comprising:
a second sealing element in the annulus which is arranged between the second swirl supply line and the expansion turbine section,
wherein in a third flow circuit the cooling fluid flows through the second swirl supply line, through the annulus, through the second sealing element, and into the expansion turbine section.

13. The gas turbine as claimed in claim 11,
wherein the discharge line is arranged radially in the rotor.

14. The gas turbine as claimed in claim 11,
wherein during operation of the gas turbine, a static pressure at the outlet of the first swirl supply line toward the annulus is greater than a static pressure in the annulus at the compressor section.

15. The gas turbine as claimed in claim 11,
wherein the one end of the annulus which is associated with the compressor section is designed in such a way that during operation of the gas turbine the cooling fluid can be transferred into a region of a last rotor blade row of the compressor section.

16. The gas turbine as claimed in claim 11,
wherein both the first swirl supply line and the second swirl supply line are provided in the inner casing part.

17. The gas turbine as claimed in claim 11,
wherein both the first swirl supply line and the second swirl supply line are in fluid communication with the same plenum for supplying with cooling fluid at the same pressure.

18. The gas turbine as claimed in claim 11, wherein in a fourth flow circuit the cooling fluid flows from the first swirl supply line and through the first sealing element.

19. The gas turbine as claimed in claim 11, further comprising a diffuser, wherein in the first flow circuit the cooling fluid flows from the outlet of the compressor section, to the diffuser, and then to the first swirl supply line, and wherein in the second flow circuit the cooling fluid flows from the compressor section, to the diffuser, and then to the second swirl supply line.

\* \* \* \* \*